United States Patent [19]

Wiemeri et al.

[11] Patent Number: 5,267,594
[45] Date of Patent: Dec. 7, 1993

[54] GRAPPLE SAW WITH POSITIVE PRESSURE GRAPPLE ARMS

[75] Inventors: Ronald W. Wiemeri; Terrance A. Fisher, both of Owatonna, Minn.

[73] Assignee: Blount, Inc., Montgomery, Ala.

[21] Appl. No.: 929,095

[22] Filed: Aug. 13, 1992

[51] Int. Cl.$^5$ .................................. A01G 23/08
[52] U.S. Cl. .................. 144/336; 144/3 D; 144/34 R
[58] Field of Search ............... 144/3 D, 34 R, 34 E, 144/335, 336, 338, 339

[56] References Cited

U.S. PATENT DOCUMENTS

| | | | |
|---|---|---|---|
| 3,902,538 | 9/1975 | Muirhead | 144/336 |
| 3,994,325 | 11/1976 | Cryder et al. | 144/336 |
| 4,039,010 | 8/1977 | Tucek | 144/34 R |
| 4,083,291 | 4/1978 | Larsson | 144/34 R |
| 4,161,200 | 7/1979 | Albright | 144/34 R |
| 4,219,059 | 8/1980 | Albright | 144/34 R |
| 4,546,805 | 10/1985 | Jahr et al. | 144/34 R |

FOREIGN PATENT DOCUMENTS

| | | | |
|---|---|---|---|
| 1090292 | 5/1984 | U.S.S.R. | 144/34 R |
| WO92/03040 | 3/1992 | World Int. Prop. O. | 144/34 R |

*Primary Examiner*—W. Donald Bray
*Attorney, Agent, or Firm*—Klarquist, Sparkman, Campbell, Leigh and Whinston

[57] ABSTRACT

A grapple saw is provided with positive pressure grapple arms to securely hold trees during felling. The grapple saw has a frame for receiving a tree to be felled. A grapple arm mounted on the frame pivots to hold the tree against the frame as it is severed by a saw. Positive pressure is provided to the clamping arm during the severing operation to prevent movement of the tree.

5 Claims, 2 Drawing Sheets

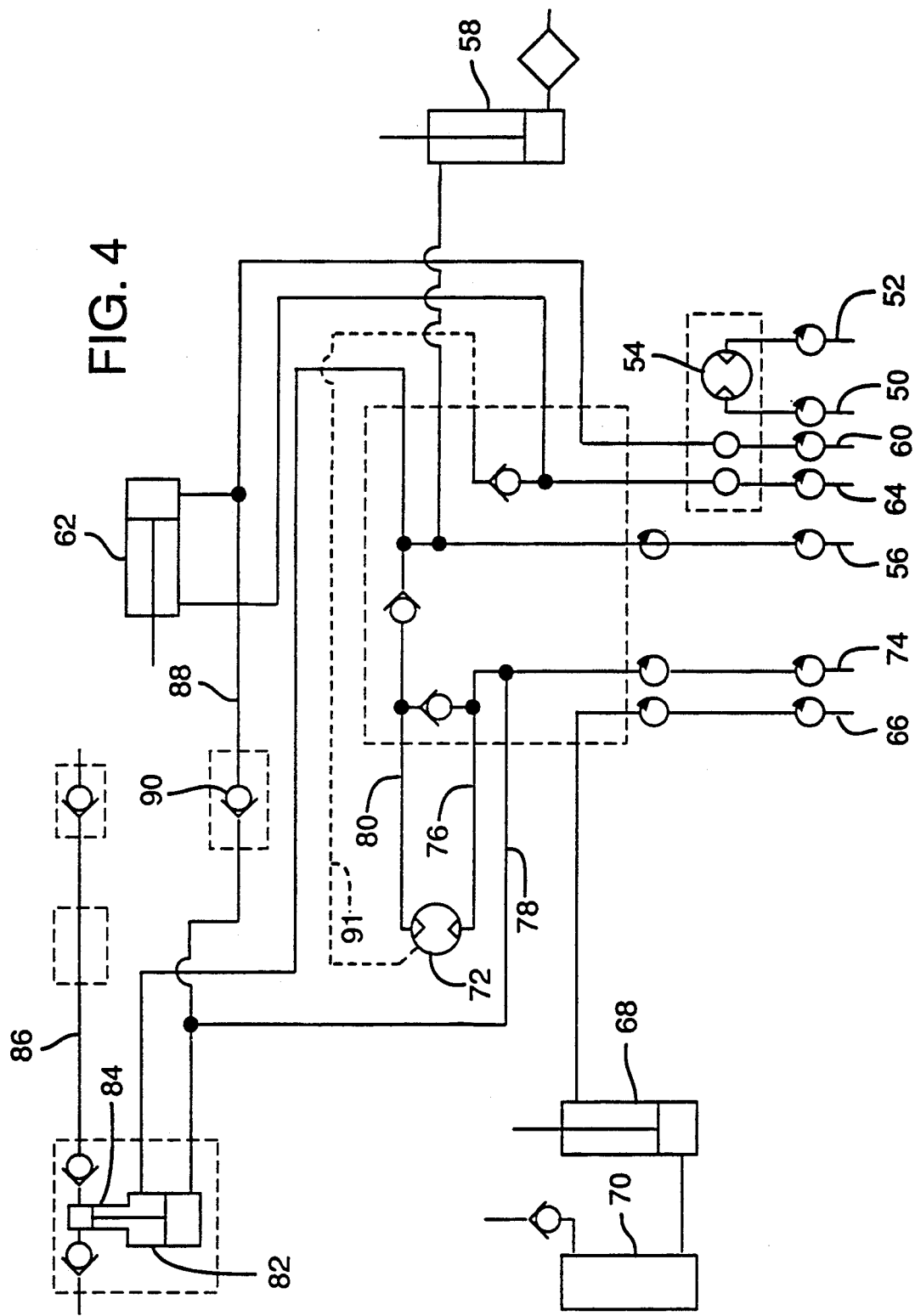

GRAPPLE SAW WITH POSITIVE PRESSURE GRAPPLE ARMS

BACKGROUND OF THE INVENTION

1. Field of the Invention

The present invention relates to grapple saws, and more particularly, to a grapple saw that maintains a positive clamping pressure on the grapple arms during the cutting operation.

2. Description of Related Art

Grapple saws have become widely accepted as providing a fast and efficient means for harvesting trees. A grapple saw is typically attached to a mobile unit, such as a tractor, which supports the grapple saw and allows it to be maneuvered during the tree harvesting operation. In operation, the mobile unit is driven up to a tree to be harvested and the grapple saw is moved into position adjacent the tree. In a typical grapple saw, two hydraulic grapple arms are provided. With the saw in position adjacent the tree, pressure is applied to a hydraulic piston controlling the grapple arms causing them pivot and clamp the tree against the frame of the grapple saw. The grapple arms are then locked in the clamped position where they serve to grip the tree and support it during the cutting operation.

The base of the grapple saw is provided with a chain saw blade for severing the tree. Normally the chain saw blade is in a retracted position within the grapple saw housing. However, with the grapple arms in the clamped position, the saw swings out of the housing to sever the base of the tree. As the tree is being severed, the grapple saw frame can apply directional pressure to the tree. This directional pressure is important to maintain an open kerf and prevent binding of the chain saw blade. The directional pressure can also be used to control the direction the severed tree will fall.

In order to maintain the directional pressure on the tree during felling, it is necessary for the grapple arms to maintain a firm grip on the tree. However, in existing grapple saws once the grapple arms are moved to the clamped position, no further pressure is applied to the hydraulic cylinder controlling the grapple arms. That is, the clamping pressure is maintained only by the residual pressure in the hydraulic cylinder and the hydraulic lines leading thereto. As a result, it is not uncommon for the grapple arms to loosen during the felling operation. Such loosening can result from natural leakage in the hydraulic circuit or from a shift in the grapple saw frame on the tree during the felling operation.

Whatever the cause, loosening of the grapple arms may allow the grapple saw frame to slide and shift relative to the tree. If this occurs while the saw blade is in the kerf, the saw blade can be bent or broken, dramatically reducing the efficiency of tree harvesting operations.

SUMMARY OF THE INVENTION

Accordingly, it is an object of the present invention to provide a grapple saw that maintains positive pressure to the grapple arms throughout the sawing operation.

It is another object of the invention to provide a grapple saw that is simple and inexpensive to operate and maintain.

A grapple saw in accordance with one aspect of the present invention has a frame defining a tree receiving area for receiving a tree to be felled. An actuator causes a pivotable grapple arm to clamp the tree against the frame. The actuator provides a positive clamping force to the grapple arm while the tree is severed with a saw blade.

Other objects and aspects of the invention will become apparent to those skilled in the art from the detailed description of the invention which is presented by way of example and not as a limitation of the present invention.

BRIEF DESCRIPTION OF THE DRAWINGS

FIG. 4 is a hydraulic circuit diagram for the grapple saw of FIG. 1.

DESCRIPTION OF THE ILLUSTRATED EMBODIMENT

Figure 1:
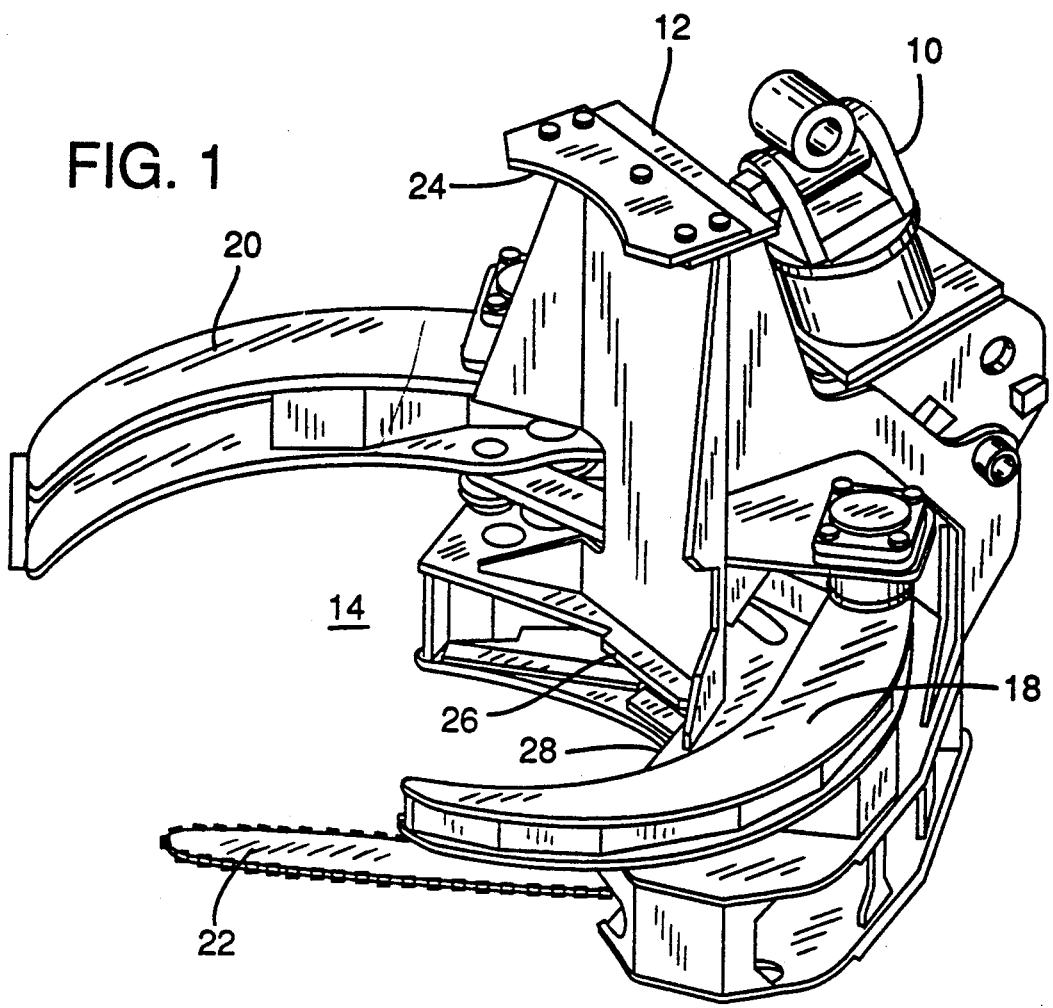
FIG. 1 illustrates a grapple saw in accordance with a preferred embodiment of the present invention.
Figure 2:
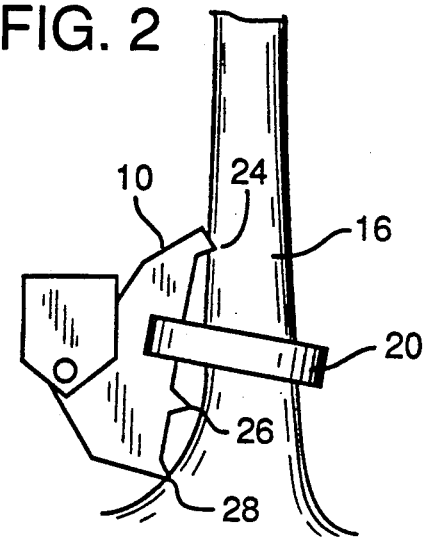
FIG. 2 shows the grapple saw of FIG. 1 in position adjacent a tree to be felled.
Figure 3:
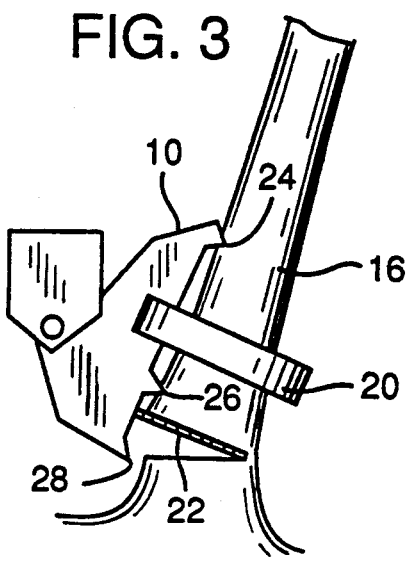
FIG. 3 shows the grapple saw of FIG. 2 during the felling operation.

A typical grapple saw 10 is illustrated in FIG. 1. The grapple saw 10 is provided with a frame 12 which defines an open region 14 for receiving a tree to be felled. In operation, the grapple saw 10 is typically attached to a mobile unit, such as a tractor (not shown), which allows the grapple saw 10 to be moved into position adjacent a tree to be felled. As seen in FIGS. 2 and 3, the grapple saw is positioned adjacent the tree 16 with the tree 16 received in the tree receiving region 14. The grapple saw 10 is provided with two grapple arms 18 and 20 which pivot to grasp the tree 16 and clamp it firmly against the frame 12 of the grapple saw. With the tree 16 firmly grasped by the grapple arms 18 and 20, an upward force and a directional force are applied to the grapple saw by the tractor. In the illustrated embodiment, a chain saw blade 22 is then advanced outward from the base of the grapple saw 10 to sever the tree 16. As the tree falls, the saw blade 22 is retracted and the grapple arms 18 and 20 are released.

The upward and directional forces serve to assist in the tree felling operation. In particular, as seen in FIG. 3, the upward and directional forces open the kerf as the tree is being severed. This allows the saw blade 22 to cut smoothly and efficiently.

As best seen in FIGS. 2 and 3, the frame 12 is provided with an upper contact point 24, an intermediate contact point 26, and a lower contact point 28. Ideally, when the tree 16 is clamped against the frame 12, the tree 16 is in contact with at least two of these contact points. In this manner, the contact points provide a solid seat against which the grapple arms 18 and 20 can clamp the tree 16 to hold it securely to the frame as it is severed. As illustrated in FIG. 2, a typical tree 16 has a large base with a substantial taper near the ground. Thus, when the grapple arms 18 and 20 are in the clamped position the lower contact point 28 and the upper contact point 24 contact the tree 16 but the intermediate contact point 26 does not.

However, as shown in FIG. 3, as the tree 16 is severed the grapple saw 10 pivots, causing the lower contact point 28 to separate from the tree. Because the lower contact point 28 is no longer in contact with the tree 16 the grip on the tree loosens allowing the saw frame to move with respect to the tree. If the grapple arms 18 and 20 remain loose, the saw frame can slide and break or severely damage the extended saw blade 22. To prevent this, the grapple arms 18 and 20 are provided with a positive clamping pressure throughout the severing process. As a result of the positive clamping pressure, when the lower contact point 28 loses contact with the tree 16 the grapple arms 18 and 20 immediately clamp the tree 16 against the intermediate contact point 26. In this manner, the saw frame 10 is held firmly against the tree 16 throughout the severing operation and the possibility of damage to the saw 22 is drastically reduced.

A schematic diagram showing a hydraulic system for operating the grapple saw 10 in accordance with a preferred embodiment of the present invention is illustrated in FIG. 4. The controls for the illustrated hydraulic system are mounted on the tractor within convenient reach of an operator. These controls are of a type well known to those skilled in the art and are not described here. Lines 50 and 52 provide hydraulic fluid at a maximum pressure of about 1000 psi to a rotator motor 54. The rotator motor serves to rotate the grapple saw 10 in a horizontal plane to properly position the grapple saw 10 with respect to the tree 16. To rotate the grapple saw 10 in one direction fluid is provided to the rotator motor 54 via line 50 and returned via line 52. To rotate the grapple saw 10 in the opposite direction fluid is provided via line 52 and returned via line 50.

Line 56 provides fluid to the rod end of a pivot cylinder 58 at a maximum pressure of about 750 psi. The base end of the pivot cylinder is vented to the atmosphere. The pivot cylinder pivots the grapple saw 10 in a vertical plane. To raise the grapple saw 10 into a vertical cutting position, fluid is provided to the rod end of the pivot cylinder 58. Once the saw is in position adjacent the tree 16, the pressure in line 56 is reduced to zero. In this manner, as the tree 16 begins to fall, the grapple saw 10 will pivot with the tree 16. As the saw pivots, the fluid in the rod end of the pivot cylinder 58 is returned via line 56.

Line 60 provides fluid to the base end of grapple cylinder 62 at a maximum pressure of about 3000 psi. In the illustrated embodiment, grapple cylinder 62 has a four inch diameter. Application of pressure to line 60 actuates the grapple cylinder causing the grapple arms 18 and 20 to move to the clamped position and apply a clamping pressure to the tree 16. Fluid in the rod end of the grapple cylinder 62 is returned via line 64. To open the grapple arms 18 and 20, fluid is provided to the rod end of the grapple cylinder 62 at a maximum pressure of about 2650 psi via line 64. Fluid returns from the base end of the grapple cylinder 62 via line 60.

Actuation of feed cylinder 68 causes the saw blade to extend from the grapple saw 10 to sever the tree 16. The feed cylinder 68 is actuated by providing fluid via line 66 to the rod end of the feed cylinder 68 at a maximum pressure of about 500 psi. The base end of the feed cylinder 68 is connected to an air tank 70 pressurized to about 175 psi. Actuation of the feed cylinder 68 further pressurizes the air in tank 70. In this manner, when the tree 16 is severed, the pressure in line 66 is removed and the pressure in tank 70 returns the feed cylinder 68 to its retracted position with fluid being returned via line 66.

The saw motor 72, which controls the cutting chain on the saw blade 22, is activated by supplying fluid via line 74 at a maximum pressure of about 2800 psi. Also, activation of the saw motor 72 pilots a two-position directional valve in the tractor (not shown) to open line 64 and allow the rod of cylinder 62 to drain to reservoir.

With line 64 open, the motor can also drain via line 91 direct to reservoir. In the illustrated embodiment, the saw motor 72 has a capacity of approximately 1.16 cubic inches per revolution. Line 74 branches to lines 76 and 78. Line 76 provides fluid to the saw motor 72. Fluid returns from the saw motor 72 via line 80 which joins with line 56.

Line 78 provides pilot fluid to activate the chain oiler 82. Actuation of the chain oiler 82 presses a plunger 84 to release lubricating oil from a storage reservoir (not shown) via line 86 to the saw blade 22.

In operation, after the grapple cylinder 62 is actuated to move the grapple arms 18 and 20 to the clamped position, line 60 is closed. Thus, it provides no further clamping pressure. In time, the pressure in line 60 may leak, or otherwise decrease, so that the grapple arms 18 and 20 become loose. To avoid this, line 88 is provided from line 78 to line 60. A check valve 90 prevents flow from line 60 to line 78 during activation of the grapple cylinder 62. However, after the activation of the grapple cylinder should the pressure in line 60 drop below the pressure in line 78, fluid will flow through line 88 to replenish the grapple cylinder 62 and provide a positive clamping pressure to the grapple arms 18 and 20 throughout the sawing operation.

In the illustrated embodiment, the fluid for replenishing the grapple cylinder 62 is tapped from the saw feed line 74. The saw feed line 74 is ideally suited for this because it provides fluid at a pressure below the maximum pressure for the grapple cylinder, yet high enough to provide adequate clamping force to the grapple arms 18 and 20. However, in other embodiments it may be desirable to provide another source for maintaining a positive pressure on the grapple cylinder throughout the sawing operation.

It should be appreciated that the exact configuration of the illustrated hydraulic system can vary from one application to another. Similarly, in varying applications various pressures and components can be used. The detailed description of the components, pressures, and configuration described herein should not be considered to limit the scope thereof in any way. Clearly, numerous additions, substitutions, and other modifications can be made to the invention without departing from the scope of the invention which is defined in the appended claims and equivalents thereof.

What is claimed is:

1. A grapple saw for felling a tree comprising:
   a saw frame defining a tree receiving area for receiving said tree;
   a grapple arm pivotally mounted on said saw frame, said grapple arm pivotable from an open position to a clamped position in which said grapple arm clamps said tree against said frame within said tree receiving area;
   a saw for severing said tree;
   a hydraulic cylinder coupled to said grapple arm and actuable to move said grapple arm from said open position to said clamped position; and
   a hydraulic circuit for actuating said hydraulic cylinder, the hydraulic circuit having a first line for supplying fluid at a first pressure to the hydraulic cylinder to move the grapple arm from said open position to said clamped position, a second line for supplying fluid at a second pressure, and a valve interposed between said second line and said hydraulic cylinder such that fluid from the second line is provided to said hydraulic cylinder when the pressure in said hydraulic cylinder drops below said second pressure to maintain a clamping force on said tree while said tree is severed.

2. The grapple saw of claim 1 wherein the first pressure is higher than the second pressure.

3. The grapple saw of claim 2 in which said saw comprises a hydraulic motor.

4. The grapple saw of claim 3 in which the second line coupled said motor to said hydraulic cylinder whereby the pressure within said cylinder is at least as great as the pressure driving said motor.

5. A method of severing a tree comprising the steps of:

positioning a grapple saw adjacent said tree with said tree received in a tree receiving area defined by a frame of said grapple saw;

supplying hydraulic pressure through a first line to a grapple arm mounted to the grapple saw to move the grapple arm from an open position to a closed position in which it applies a clamping pressure to clamp said tree within said tree receiving area;

closing the first line when said grapple arm is in the closed position so that the first line supplies no further pressure to the grapple arm;

supplying hydraulic pressure through a second line to said grapple arm when the clamping pressure drops below a predetermined level; and severing said tree while it is clamped in the tree receiving area.

* * * * *